United States Patent

[11] 3,625,823

| [72] | Inventors | John M. Kerr;<br>Gordon C. Larson, both of Lynchburg, Va. |
|---|---|---|
| [21] | Appl. No. | 743,504 |
| [22] | Filed | July 9, 1968 |
| [45] | Patented | Dec. 7, 1971 |
| [73] | Assignee | The Babcock & Wilcox Company<br>New York, N.Y. |

[54] NUCLEAR FUEL ROD
7 Claims, 1 Drawing Fig.

[52] U.S. Cl. .................................................. 176/79,
176/37, 176/68
[51] Int. Cl. .................................................... G21c 3/10
[50] Field of Search ............................................ 176/79, 68,
37, 80, 87

[56] References Cited
UNITED STATES PATENTS

| 3,010,889 | 11/1961 | Fortescue et al. ............ | 204/193.2 |
| 3,118,819 | 1/1964 | Alfille et al. .................. | 176/79 |
| 3,141,829 | 7/1964 | Fortescue et al. ............ | 176/68 X |
| 3,141,830 | 7/1964 | Klepfer et al. ................. | 176/68 |
| 3,172,821 | 3/1965 | Meyers .......................... | 176/79 X |
| 3,180,804 | 4/1965 | Flora et al. .................... | 176/79 |
| 3,189,525 | 6/1965 | Davis............................. | 176/79 X |
| 3,197,381 | 7/1965 | Blake ............................ | 176/79 |
| 3,238,108 | 3/1966 | Deddens et al. .............. | 176/79 X |
| 3,324,540 | 6/1967 | Lotts et al. .................... | 176/79 X |
| 3,357,893 | 12/1967 | Gatley et al. .................. | 176/79 X |

*Primary Examiner*—Carl D. Quarforth
*Assistant Examiner*—Gary Solyst
*Attorney*—J. Maguire

ABSTRACT: A sheathed nuclear fuel rod sealed by end caps and having foamed zirconia plugs which separate and thermally insulate the end caps from the fuel material, and also provide internal support for the sheathing and for the fuel.

PATENTED DEC 7 1971
3,625,823
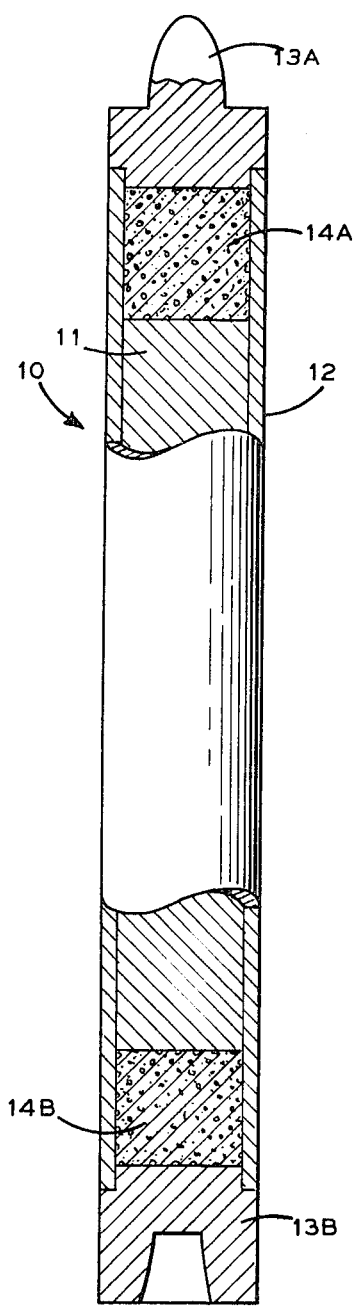
INVENTORS
John M. Kerr
Gordon C. Larson
BY
J Maguire
ATTORNEY

NUCLEAR FUEL ROD

BACKGROUND AND SUMMARY OF THE INVENTION

This invention relates in general to nuclear fuel rods for use in nuclear reactors and more particularly to a metallic sheathed fuel rod sealed by welded metal end caps and having ceramic plugs which separate and thermally insulate the end caps from the fuel.

In nuclear reactors the fuel rods used in forming a fuel element are ordinarily positioned in a spaced array or lattice designed so that as the fission chain reaction proceeds the heat generated by the reaction is extracted by a coolant fluid flowing over the exterior surface of the individual fuel rods. In addition to generating heat, the fission reaction also produces gaseous products which in this instance are contained within each individual fuel rod container tube without coming in direct contact with the coolant fluid.

A typical nuclear fuel rod comprises a quantity of nuclear fuel material compacted into a metal tube which is sealed at its ends by metal end caps. Since during reactor operation the nuclear fuel becomes quite hot, reaching temperatures in the order of 1100° C., it must necessarily be prevented from contacting the end caps in order to forestall their failure or failure of the cladding adjoining them due to overheating of the metal and excessive thermal stresses. Also to accommodate the gaseous fission products, it is necessary to provide a plenum volume at one or both ends of the fuel rod.

Certain prior art fuel pin constructions, such as for example, those shown and described by U.S. Pat. No. 3,141,830 to Klepfer et al., provide fuel elements with internal gas containment plenums and do to some extent limit the amount of heat transferred from the nuclear fuel to the end caps. However, in fuel pins of this type the end caps are of hollow, sleevelike construction to provide the gas plenum volume and at the same time furnish internal support for the container tube along the length coextensive with gas plenum volume. As a result, the inner end of the end cap sleeve portion is in direct contact with the fuel. Within the hollow portion of each Klepfer et al., end cap is inserted a fluid permeable resilient compact which it is said, through mechanisms not yet fully understood, prevents the generation of the normally expected increase in internal pressure within the fuel pin due to the fission gas products. This compact can take the form of a mat or compress of chips, granules, shavings, wool, wire, powder, or the like of a material selected from the group consisting of the elemental metallic or alloy forms of zirconium, niobium, titanium, yttrium, or hafnium or mixtures and alloys thereof. In any case, there is a metallic compact within each end cap that is in direct contact with the fuel.

The fuel element according to the instant invention can readily be distinguished from that of Klepfer et al., by reason of the fact that it provides a fuel element construction wherein no portion of the end cap directly contacts the fuel. This is accomplished by a clad fuel pin assembly having sealing end caps each connected to a corresponding tube end, with foamed ceramic plugs inserted into the tube in the space between the end cap and the fuel material. With this arrangement it will be observed that the end cap is removed from direct contact with the fuel. At the same time the plugs serve to thermally insulate the end cap from the heat generated by the nuclear fuel. The voids in the foamed plugs accommodate the thermal expansion of the nuclear fuel as its temperature increases and provide space for retension of the fission gases resulting from the nuclear reaction.

Preferably, the ceramic plugs are made of foamed zirconia and occupy substantially the entire space within the tubular container not occupied by the nuclear fuel. They are press fitted into the tube to maintain the fuel in proper position during rod assembly and subsequent handling, and when the reactor is in operation to provide internal support against the externally applied pressure of the primary coolant.

There are several advantages to be gained by using foamed zirconia plugs to separate the end caps and the fuel:

1. foamed zirconia is a good refractory insulator,
2. it is readily obtainable with void volumes of 80 to 90 percent, yet at such void volumes it still has sufficient compressive strength to provide adequate internal support for the fuel and the end portions of the tubular fuel rod, and
3. it is crushable to compensate for thermal expansion of the fuel column, and is chemically inert with respect to the nuclear fuel and the cladding of the fuel rods.

The various features of novelty which characterize the invention are pointed out with particularity in the claims annexed to and forming a part of this specification. For a better understanding of the ivention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing is presented a longitudinal sectional view of a nuclear fuel rod according to a preferred embodiment of the invention.

DESCRIPTION OF THE PREFERRED EMBODIMENT OF THE INVENTION

The drawing illustrates a nuclear fuel rod 10 constructed in accordance with the invention, with a charge of nuclear fuel material 11 compacted into the central portion of a metal clad tube 12. The tube 12 is sealed at both ends by metal end caps 13A and 13B connected one to each end of tube 12. Foamed ceramic plugs 14A and 14B are inserted into the tube 12 in the spaces between the boundaries of the fuel charge 11 and end caps 13A and 13B respectively.

The plugs 14A, 14B serve to separate their respectively associated end caps 13A, 13B from the fuel 11, maintain the fuel in its desired location within tube 12 and thermally insulate the end caps from the heat generated by nuclear fission reactions occurring within the fuel 11 when the fuel rod 10 is in use in an operating nuclear reactor.

It has been found that plugs formed of foamed zirconia (zirconium oxide) advantageously provide suitable support for tube 12 and its fuel loading, with sufficient crushability to allow for the normally expected thermal expansion of the fuel 11. Zirconia is in fact an excellent material for the plugs 14A, 14B in that it is commercially available in block form with void volumes 80 to 90 percent of gross geometrical volume, and on test had a compressive strength in the order of 250 p.s.i. without deforming and when crushed at compressive stresses approaching 900 p.s.i. still displayed satisfactory physical characteristics.

Plugs 14A, 14B occupy substantially the entire space within tube 12 between the boundaries of the fuel 11 and associated end caps 13A, 13B, and are preferably press fitted into tube 12 to provide internal support for the fuel charge and for the extending end portions of the tube. The plugs 14A, 14B can be easily cut, even to small diameters, from a block of foamed zirconia simply by using a tubular shear punch, thus no special or unusual equipment is needed to make them. Furthermore, because of the compressible nature of foamed zirconia, the plugs 14A, 14B need not be machined accurately to fit into the tube 12 but can be rough cut and press fitted into it. This is particularly advantageous with compacted fuel since foamed zirconia plugs in close fitting contact with the tube 12 wall will prevent any fuel siftings from coming into contact with the end caps 13A, 13B.

Other advantages realized by using foamed zirconia plugs are that they are inert to uranium oxide based fuels at temperatures up to the order of 1,100° C., and are resistant to dissolution by mixtures of nitric acid and hydrofluoric acid commonly used in the Chop-Leach method of fuel reprocessing. Also when undissolved zirconia is exposed to aqueous solutions containing plutonium, as during fuel reprocessing, very little plutonium is absorbed from the solution by the zirconia.

It should be noted that the than utilizes the refractory insulation properties of a metallic oxide, namely zirconium oxide, to restrict the flow of heat from the fuel 11 to the end caps 13A, 13B and thereby limit the temperatures attained by such end caps 13A, 13B. While a porous metallic material might be compacted between the end caps 13A, 13B and the fuel, as proposed by the Klepfer et al. patent, such metallic material would invariably have a higher heat transfer coefficient than the corresponding metal oxide, thus raising the temperatures of the end caps 13A, 13B, and the metallic material itself would be subject to deterioration and/or melting by the high temperature of the fuel.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear fuel element which comprises a cladding tube, a quantity of nuclear fuel material packed into said cladding tube, a pair of end caps each connected to a corresponding end of said cladding tube to seal same, and a pair of foamed ceramic plugs inserted into said cladding tube one between and adjacent to each end cap and the fuel material to separate the end cap from contact with the fuel material and to thermally insulate the end cap from the heat generated by nuclear reactions occurring within said fuel material, said foamed ceramic plugs having a void volume that is a major fraction of the total volume occupied by the plug, the voids in said foamed ceramic plugs being disposed to retain the gases generated by such nuclear reactions.

2. A nuclear fuel element according to claim 1 wherein said foamed ceramic plugs occupy substantially the entire space within the cladding tube between the boundaries of the fuel material and their respectively associated end caps, and are press fitted into the cladding tube to internally support same.

3. A nuclear fuel element according to claim 2 wherein said foamed ceramic plugs have a compressive strength of at least 250 p.s.i. and are crushable at a compressive stress not exceeding 900 p.s.i. to accommodate thermal expansion of the fuel material.

4. A nuclear fuel element according to claim 2 wherein said foamed ceramic plugs have a void volume at least 80 percent of the volume which they occupy within the cladding tube.

5. A nuclear fuel element according to claim 2 wherein said foamed ceramic plugs are inert to uranium oxide based fuel material at temperatures up to approximately 1,100° C.

6. A nuclear fuel element according to claim 2 wherein said ceramic plugs are resistant to dissolution by nitric acid and by mixtures of nitric acid and hydrofluoric acid of limited concentration.

7. A nuclear fuel element according to claim 2 wherein said ceramic plugs are made of foamed zirconia.

* * * * *